United States Patent
Yu (10) Patent No.: US 9,912,984 B2
(45) Date of Patent: Mar. 6, 2018

(54) DEVICES AND METHODS FOR OBTAINING MEDIA STREAM WITH ADAPTIVE RESOLUTIONS

(71) Applicants: Hisense USA Corp., Suwanee, GA (US); Hisense Electric Co., Ltd., Qingdao (CN); Hisense International Co., Ltd., Qingdao (CN)

(72) Inventor: Ke Yu, Alpharetta, GA (US)

(73) Assignees: Hisense USA Corp., Suwanee, GA (US); Hisense Electric Co., Ltd., Qingdao, Shandong (CN); Hisense International Co., Ltd., Qingdao, Shandong (CN)

(*) Notice: Subject to any disclaimer, the term of this patent is extended or adjusted under 35 U.S.C. 154(b) by 256 days.

(21) Appl. No.: 14/562,280

(22) Filed: Dec. 5, 2014

(65) Prior Publication Data

US 2016/0165301 A1    Jun. 9, 2016

(51) Int. Cl.

| | |
|---|---|
| G06F 13/00 | (2006.01) |
| G06F 15/00 | (2006.01) |
| H04N 21/4363 | (2011.01) |
| H04L 29/06 | (2006.01) |
| H04N 21/436 | (2011.01) |
| H04N 21/4402 | (2011.01) |
| H04N 21/2343 | (2011.01) |
| H04N 21/462 | (2011.01) |

(52) U.S. Cl.
CPC ..... *H04N 21/4363* (2013.01); *H04L 65/1069* (2013.01); *H04L 65/4084* (2013.01); *H04L 65/60* (2013.01); *H04L 65/602* (2013.01); *H04N 21/234363* (2013.01); *H04N 21/43615* (2013.01); *H04N 21/440263* (2013.01); *H04N 21/4621* (2013.01)

(58) Field of Classification Search
CPC ..... H04N 21/4398; H04N 5/4401; H04N 5/76
USPC .............. 725/82, 25, 34; 715/700, 715, 725
See application file for complete search history.

(56) References Cited

U.S. PATENT DOCUMENTS

| | | | |
|---|---|---|---|
| 9,503,355 B2* | 11/2016 | Honda | H04L 65/605 |
| 2007/0006255 A1* | 1/2007 | Cain | H04N 5/76 |
| | | | 725/36 |
| 2008/0240230 A1* | 10/2008 | Oxman | H04N 5/4401 |
| | | | 375/240.01 |
| 2011/0131623 A1* | 6/2011 | Kang | H04N 21/4126 |
| | | | 725/110 |
| 2013/0007816 A1* | 1/2013 | Krikorian | H04N 21/4398 |
| | | | 725/74 |
| 2013/0263202 A1* | 10/2013 | Bull | H04N 21/23406 |
| | | | 725/116 |

(Continued)

*Primary Examiner* — Kevin Nguyen
(74) *Attorney, Agent, or Firm* — Brinks Gilson & Lione (57) ABSTRACT

Devices and methods for obtaining media stream with adaptive resolutions. The device includes a receiver in communication with a processor, and a transmitter. The receiver is configured to receive a plurality of media signals. The processor is programmed to communicate with a terminal device in the home network, obtain a corresponding display resolution of the terminal device, and select a media signal according to the corresponding display resolution of the terminal device and a video resolution of the media signal. The transmitter is configured to transmit media stream corresponding to the selected media signal to the terminal device.

19 Claims, 5 Drawing Sheets

(56) References Cited

U.S. PATENT DOCUMENTS

2015/0016799 A1\* 1/2015 Park .................. G06Q 10/10
386/224

\* cited by examiner

DEVICES AND METHODS FOR OBTAINING MEDIA STREAM WITH ADAPTIVE RESOLUTIONS

BACKGROUND

Currently, there may be several different kinds of terminal devices in a home network, such as smart TVs, tablets, smart phones, computers etc. Each of these terminal devices may obtain media signals through the home network, and then display the media signal.

In a video program, there is only one video program that provides a single video resolution. The video program may be received by a network device in a user's home. The network device may then send the video program to terminal devices in the home network. In a home network, these terminal devices may be configured to consume media streaming content.

SUMMARY

In an aspect, one or more embodiments of this disclosure disclose a device in a home network. The device includes a receiver in communication with a processor, and a transmitter. The receiver is configured to receive a plurality of media signals. The processor is programmed to communicate with a terminal device in the home network, obtain a corresponding display resolution of the terminal device, and select a media signal according to the corresponding display resolution of the terminal device and a video resolution of the media signal. The transmitter configured to transmit media stream corresponding to the selected media signal to the terminal device.

In another aspect, one or more embodiments of this disclosure disclose a method implemented in a device including a processor. In the method, the device receives a request for media stream from a terminal device over a network. The device identifies a terminal profile based on the request. The device selects a media signal according to the terminal profile and a video resolution of the media signal. The device sends media stream corresponding to the selected media signal to the terminal device.

In yet another aspect, one or more embodiments of this disclosure disclose a non-transitory storage medium configured to store a set of instructions. The set of instructions is to direct a computer system to perform the following acts: receiving a request for media stream from a terminal device over a network; identifying a terminal profile based on the request; selecting a media signal according to the terminal profile and a video resolution of the media signal; and sending media stream corresponding to the selected media signal to the terminal device.

DETAILED DESCRIPTION OF THE DRAWINGS

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. section 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

The term "user" is used to describe one or more operators of a device. The "user" may include a human user or a machine that operates or uses the device.

Figure 1:
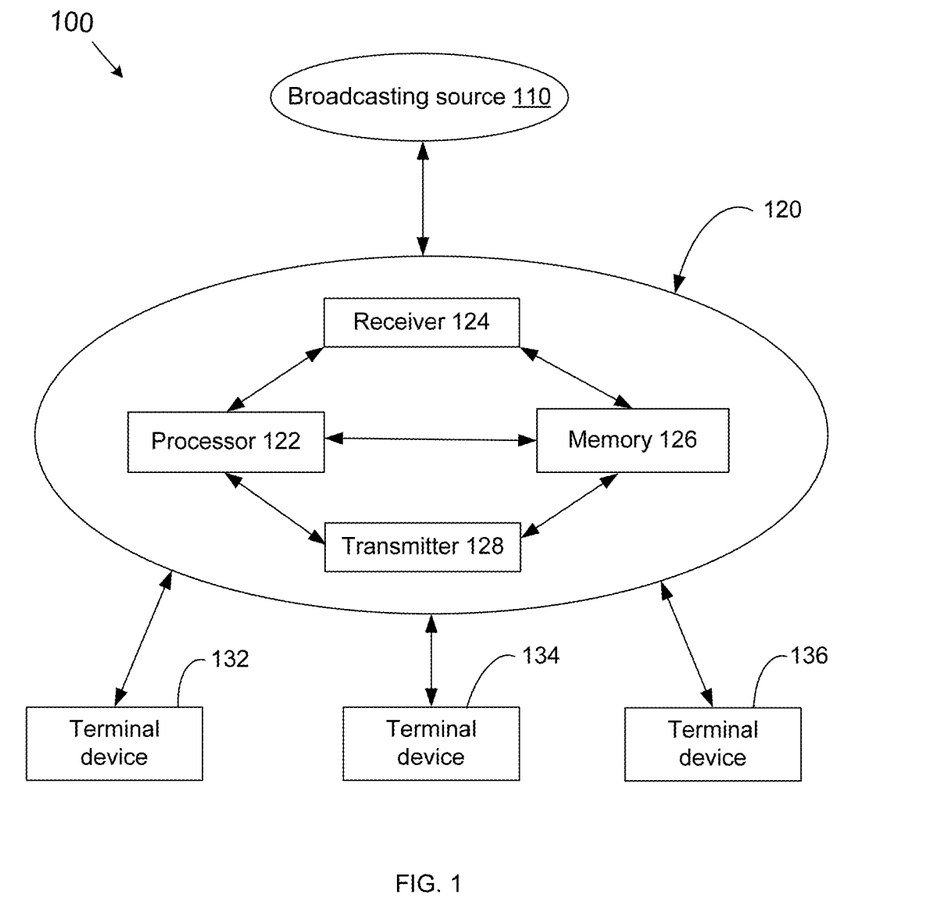
FIG. 1 is a block diagram of an example environment in which a system according to one or more embodiments of the disclosure may operate.

FIG. 1 is a block diagram of an example environment in which a system according to one or more embodiments of the disclosure may operate. The example environment 100 may include a home network system that includes a controller 120 and a plurality of terminal devices 132, 134, and 136. The controller 120 may be implemented in a network device or may be a separate device. The terminal devices may include one of: a television set, a LCD TV, a LED TV, a laptop, a smart phone, a media player, a smart watch, or any device including a video display unit.

The home network may be a type of local area network that develops from the need to facilitate communication and interoperability among digital devices present inside or within the close vicinity of a home. The home network may rely on at least one of the following network devices to establish physical layer, data link layer, and network layer connectivity both internally amongst devices and externally with outside networks: a modem, a router, a network switch, or a wireless access point.

The home network system may include a wireless network at a residential home or a local network in a business building. In either case, the controller 120 may receive media signals from a broadcasting source 110. The broadcasting source 110 may be connected to the controller 120 by a cable, a fiber, or any other wired or wireless communication channel. The broadcasting source 110 may provide media signals to the controller or other devices. The media signals may include video signals, audio signals, live video signals, or any signals that may generate a multimedia effect. And the controller 120 also may receive media signals from a radio frequency signal source or a media signal source or a TV broadcaster.

The media signals may include linear TV programs, and the linear TV programs maybe from a TV broadcaster. The linear TV programs may include live sports, live news, or other live events from cable TV, satellite TV, or Internet Protocol television (IPTV). These kind of linear TV media signals are different from video on demand (VoD) services where the user may select, skip, fast forward, and rewind a video program. For example, the linear TV media signals may include live sports programs, live music events, live entertainment events, or any other live performances, which happens simultaneously when the TV media signals are generated and transmitted. The linear TV media signals may have different video resolutions, and the linear TV media signals may include live video signals, and these live video signals may also have different video resolutions. The different video resolutions may consume different bandwidth when transmitted over the home network. The different video signals may have different visual effects when played on a terminal device. The different video signals may include video signals having different resolutions and thus enable the terminal device to play video with different resolutions.

The controller 120 may include a processor 122 in communication with a receiver 124. The receiver 124 may be configured to receive media signals from the broadcasting source 110. The receiver 124 may include a television tuner configured to receive live video signals from a radio frequency signal source, which may include cable TV signal source, Direct Broadcast Satellite signal source, or IPTV signal source. The media signals may be encoded by the broadcasting source. The receiver 124 may include hardware modules configured to decode the received media signals. The hardware modules may include a decoder module or a plurality of decoder modules. The decoder module may have different working settings to decode different types of media signals. Further, the decoder module may consume more power when the decoding procedure needs more computation power while the decoder module may consume less power when the decoding procedure needs less computation power. For example, the decoder may consume more power when decoding high definition (HD) video signals than decoding video signals with standard resolution. The high definition video signals may include 720P, 1080P video signals, and ultra HD video signals. The standard resolution video signals may include 480P, 360P, or lower resolution video signals.

The processor 122 may also be configured to implement at least part of the decoding computation. Thus, the processor 122 may consume more power when decoding HD video signals and may consume less power when decoding standard resolution video signals. Accordingly, the processor 122 may need to be cooled by a fan when decoding HD video signals. The processor 122 may be programmed to communicate with a terminal device in the home network and obtain a corresponding display resolution of the terminal device.

The controller 120 further includes a memory 126 accessible to the processor 122. The memory 126 may include both transitory storage medium and non-transitory storage medium. The non-transitory storage medium may be configured to store software modules for decoders in the receiver 122. The non-transitory storage medium may be configured to store parameters for decoders. The non-transitory storage may store information related to the corresponding display resolution of a terminal device.

The controller 120 further includes a transmitter 128 configured to send media signals to at least one of the connected terminal devices 132, 134, and 136. The transmitter 128 may be a separate hardware module that is separated from the receiver 124. Alternatively, the transmitter 128 may be integrated with the receiver 124 to be a transceiver. The transmitter 128 may have different working frequencies for different terminal devices. The transmitter 128 may have different output power levels when transmitting the video signals to different terminal devices. The output power may be determined by the processor 122 to meet the bandwidth requirements of different video signals. For example, the output power may be very high for transmitting 4K HD video signals to a smart TV while the output power may be relatively low for transmitting standard resolution video signals to a media player. Further, the output power may be affected by the physical distance between the terminal device 132 and the controller 120. Thus, the output power may need to be increased for transmitting HD video signals to terminal devices located at a peripheral region of the home network.

In a home network environment, the processor 122 is programmed to communicate with a terminal device 132 in the home network. When the terminal device is connected to the controller 120 for the first time, the processer 122 may be programmed to obtain a corresponding display resolution of the terminal device. The display resolution of the terminal device may be a native display resolution of the terminal device or other display resolution. And, the processer 122 may obtain the corresponding display resolution of the terminal device from the terminal device. Or, a user may pre-define the display resolution of the terminal device. And, if the display resolution of the terminal device is a native display resolution of the terminal device, then the display resolution of the terminal device may be obtained by the terminal device from and then sent to the processor 122.

The processor 122 may then store information related to the corresponding display resolution in the non-transitory storage. The processor may consume different power to encoding/decoding different video signals.

The processor 122 may select a media signal according to at least one preset requirement. For example, the preset requirement may require that the corresponding display resolution of the terminal device match a video resolution of the media signal. The match between the display resolution and the video resolution may include at least one of the following: a complete match between the two resolutions, a preset match condition that is pre-defined by a user of the controller 120, and a preset match that is pre-defined by a user of the terminal device. After the processor 122 selects the media signal, the transmitter 128 is configured to transmit selected media stream corresponding to the selected media signal to the terminal device.

Figure 2:
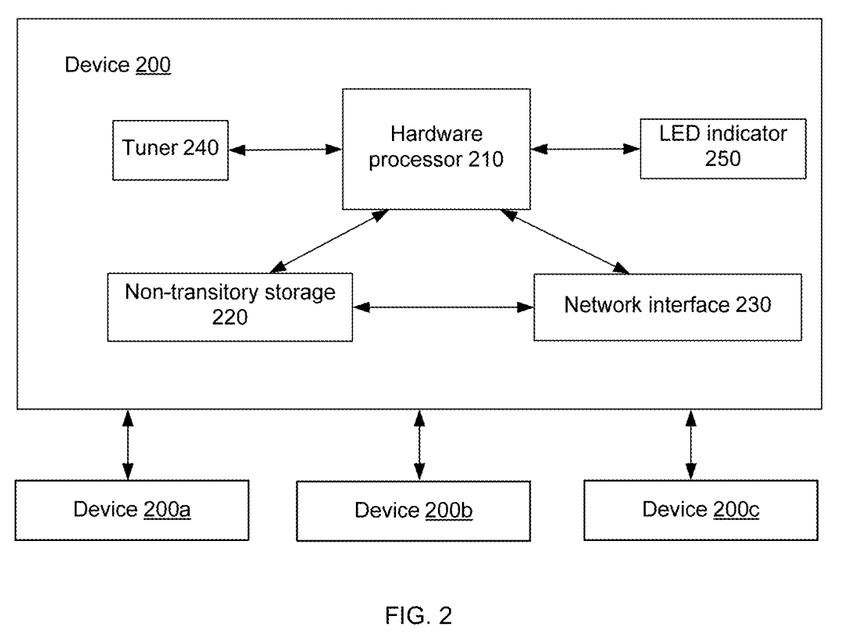
FIG. 2 illustrates an device in the system for obtaining media stream with adaptive resolutions.

FIG. 2 illustrates an example device in the system for media stream with adaptive resolutions. The device 200 may be implemented in a computing device including a hardware processor 210, a non-transitory storage medium 220, and a network interface 230. The device 200 may be configured for obtaining media signals with adaptive resolutions. The hardware processor 210 accesses the programs and data stored in the non-transitory storage medium 220. The device 200 may further include at least one tuner 240, at least one LED indicator 250, circuits, and other electronic components. The LED indicator 250 may indicate the working status of the device 200. The device may communicate with other devices 200a, 200b, and 200c via the network interface 230. The computing device 200 may display user interfaces on a display unit.

The device 200 may have more hardware components or less hardware components than the example configuration shown in FIG. 2. The device 200 may also be implemented in other hardware configurations.

Figure 3:
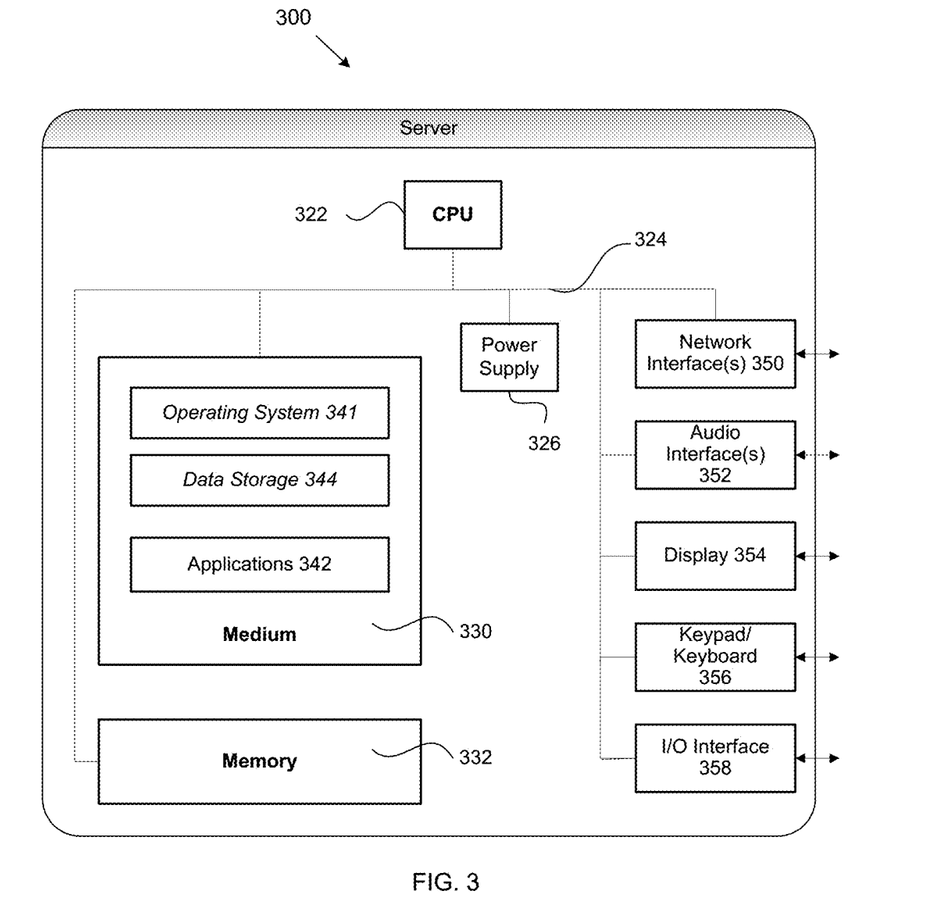
FIG. 3 illustrates an example system for obtaining media stream with adaptive resolutions.

FIG. 3 illustrates an example server system for media stream with adaptive resolutions. The server 300 may include different hardware configurations or capabilities. For example, a server 300 may include one or more central processing units 322, memory 332 that is accessible to the one or more central processing units 322, one or more medium 330 (such as one or more mass storage devices) that store application programs 342 or data 344, one or more power supplies 326, one or more wired or wireless network interfaces 350, one or more input/output interfaces 358. The memory 332 may include non-transitory storage memory and transitory storage memory.

A server 300 may also include one or more operating systems 341, such as Windows Server, Mac OS X, Unix, Linux, FreeBSD, or the like. Thus, a server 300 may include, as examples, dedicated rack-mounted servers, desktop computers, laptop computers, set top boxes, integrated devices combining various features, such as two or more features of the foregoing devices, or the like.

The server 300 in FIG. 3 may serve as a controller device 120 shown in FIG. 1. The server 300 may also serve as a computer server that implements the computer system for media signals with adaptive resolutions. In either case, the server 300 is in communication with a media signal source and a plurality of terminal devices.

Figure 4:
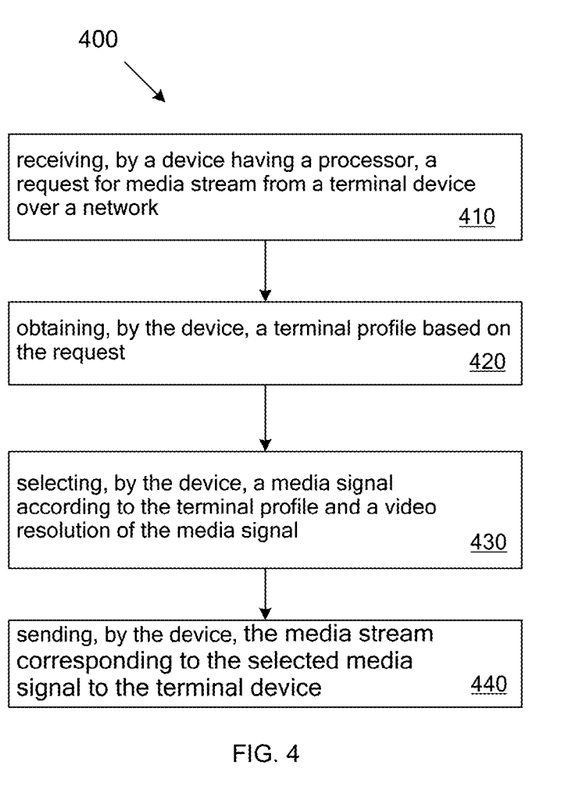
FIG. 4 is a flowchart illustrating a method for obtaining media stream with adaptive resolutions.

FIG. 4 is an example block diagram illustrating one or more embodiments of the disclosure. The example method 400 may be implemented using the device illustrated in FIG. 2. The example method 400 may also be partially implemented using the computer server illustrated in FIG. 3.

In act 410, the device receives a request for media stream from a terminal device over a network. Media stream may be transmitted in media streaming. Media stream may include audio streaming, image streaming, and video streaming. Media streaming may be implemented on Ethernet cable, coax cable, satellite link, mobile link, etc. Media streaming may include media content data flow. Media stream may correspond to media signal, and media signal may include signal that carries media content. The device may receive the request from the terminal device when a new media signal source is selected. For example, the device may receive a request each time when a user changes a channel on his TV. Further, the device may receive a plurality of media signals from a broadcasting source when the user changes the channel. The plurality of media signals may have same content while include different live video signals having different video resolutions.

In act 420, the device obtains a terminal profile based on the request. The device may obtain a terminal profile that is locally stored in a storage of the device. The device may obtain the terminal profile from a pre-stored profile in the terminal device. The device may obtain the terminal profile from a user. For example, the user may use the terminal device or other user equipment to input or change the terminal profile. The terminal profile may include information related to at least a native display resolution of the terminal device. For example, the native display resolution of a smart TV may be 1080P or higher. The native display resolution of a smart phone may be 720P or lower. A terminal device may support one or more native resolutions. The terminal device may include one or more preset resolutions predefined by a user of the terminal device. The terminal device may be adjusted by other users via a remote or other user input devices. In addition, the terminal profile may include codec parameters like frame rate, bit rate, and quantization steps etc. for each terminal device. Each terminal device may have multiple profiles corresponding to different display resolutions such as: ultra-high definition, full high definition, and standard definition. The terminal profile may include a pre-set native display resolution by a TV manufacturer.

In act 430, the device selects a media signal from the received media signals according to the terminal profile and a video resolution of the media signal. The device may select a media signal with the video resolution that matches or best matches a native display resolution of the terminal device. The match between the display resolution and the video resolution may include at least one of the following: a complete match between the two resolutions, a preset match condition that is pre-defined by a user, and a preset match that is pre-defined by a user of the terminal device. And in other embodiments, the device may select media stream from the received media stream according to the terminal profile and a video resolution of the media stream.

In act 440, the device sends the media stream corresponding to the selected media signal to the terminal device. Before sending the media stream to the terminal device, the device may convert the selected media signal into the media stream, and this conversion may be just the change of transmission mode while the content stays the same. The device may push media stream corresponding to the selected media signal to the terminal device. The device may need to determine what kind of data rate to use for transmitting the media stream to the terminal device. The device may adjust the output power of the transmitter based on the data rate and a distance between the terminal device and the device.

The acts in FIG. 4 may be implemented using different program modules in a device illustrated in FIG. 2 or FIG. 3. The acts in FIG. 4 may be implemented using a hardware processor or a combination of software and hardware.

Figure 5:
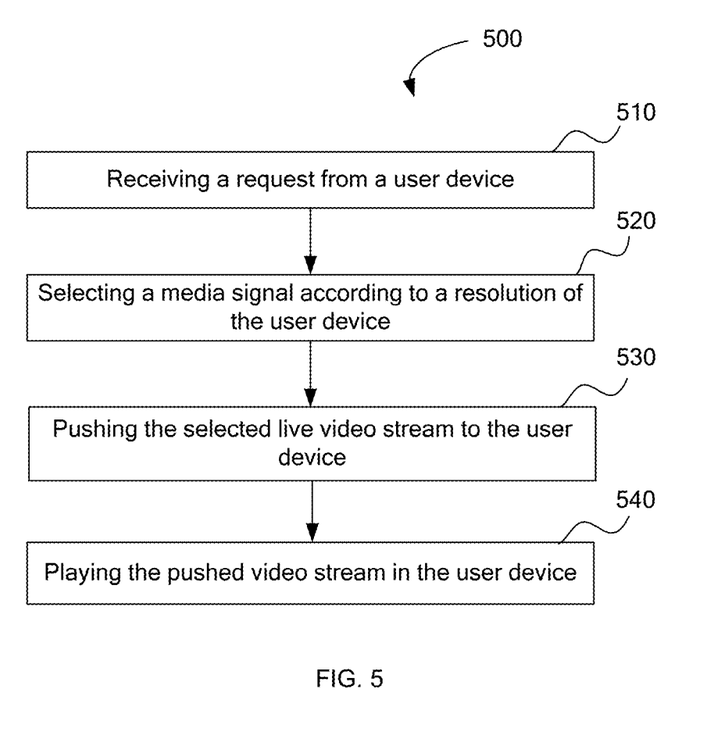
FIG. 5 is a flowchart illustrating a method for obtaining media stream with adaptive resolutions.

FIG. 5 is another example block diagram illustrating one or more embodiments of the disclosure. In act 510, a connected terminal device requests central controller for media stream over a home network. The central controller may be a media gateway. The central controller may be implemented in a server computer as well.

In act 520, based on the connected device profile, the central controller selects a media signal in the media signals that fits the display resolution of the terminal device. The fit may be a user-defined condition including one or more user-defined display resolutions. For example, the user-defined display resolutions of a smart TV may include a native display resolution of the smart TV and additional display resolutions for specific TV signal standards.

In act 530, the central controller pushes or sends media stream corresponding to the media signal to the requesting terminal device. The media signal maybe live video stream. The central controller may instruct the terminal device to set up a buffer and store the media stream in the terminal device. And, the media stream may be corresponding to the media signal, or may be have the same content as the media signal.

In act 540, the terminal device starts to play the live video stream pushed by the central controller. The terminal device may receive a user confirmation before starting to play the media stream on the terminal device. The terminal device may need to adjust the buffer size based on the data rate of the media signals.

For each terminal device, the acts in 510-540 may need to be repeated for media stream with adaptive resolution.

The disclosed system enables the terminal device to play the media stream in the native display resolution automatically. And, the media streaming may include video streaming, or live video streaming.

It is therefore intended that the foregoing description be regarded as illustrative rather than limiting, and that it be understood that it is the following claims, including all equivalents, that are intended to define the spirit and scope of this invention.

What is claimed is:

1. A device in a home network, comprising:
   a receiver configured to receive a plurality of media signals of various video resolutions from one or more media sources;
   a processor programmed to communicate with a terminal device in the home network, obtain a profile associated with the terminal device containing a corresponding preset native display resolution of the terminal device, and select from the received plurality of media signals a media signal having a video resolution matching the preset native display resolution of the terminal device; and
   a transmitter configured to transmit a media stream corresponding to the selected media signal to the terminal device.

2. The device of claim 1, wherein the receiver receives the plurality of media signals from a broadcasting source.

3. The device of claim 1, further comprising:
   a non-transitory storage that stores information related to the corresponding preset native display resolution of the terminal device.

4. The device of claim 1, wherein the plurality of media signals comprises linear TV programs.

5. The device of claim 4, wherein the linear TV programs comprises at least one of: live sports, live news, and live events from a cable TV source, a satellite TV source, or an Internet Protocol television (IPTV) source.

6. The device of claim 1, wherein the receiver comprises a television tuner configured to receive the plurality of media signals from a radio frequency signal source.

7. A method, comprising:
   receiving, by a device having a processor, a request for media stream from a terminal device over a network;
   obtaining, by the device, a profile associated with the terminal device containing a preset native display resolution of the terminal device based on the request;
   selecting, by the device, from a plurality of media signals received from one or more media sources having various video resolutions, a media signal having a video resolution matching the preset native display resolution of the terminal device contained in the obtained terminal profile as a requested media stream; and
   sending, by the device, the requested media stream to the terminal device.

8. The method of claim 7, further comprising:
   receiving, by the device, the plurality of media signals having various video resolutions from a broadcasting source.

9. The method of claim 7, wherein obtaining the terminal profile based on the request comprises at least one of the following:
   obtaining, by the device, the terminal profile locally in a storage of the device;
   obtaining, by the device, the terminal profile from a pre-stored profile in the terminal device; and
   obtaining, by the device, the terminal profile from a user.

10. The method of claim 7, further comprising:
    storing, in a non-transitory storage of the device, the terminal profile when the non-transitory storage does not already comprise the terminal profile.

11. The method of claim 7, wherein the plurality of media signals comprises linear TV programs from a TV broadcaster, and wherein the linear TV programs comprises at least one of: live sports, live news, and live events.

12. A non-transitory storage medium configured to store a set of instructions, the set of instructions to direct a device to perform acts of:
    receiving a request for media stream from a terminal device over a network;
    obtaining a profile associated with the terminal device containing a preset native display resolution of the terminal device based on the request;
    selecting from a plurality of media signals received from one or more media sources having various video resolutions, a media signal having a video resolution matching the preset native display resolution of the terminal device contained in the obtained terminal profile as a requested media stream; and
    sending the requested media stream to the terminal device.

13. The non-transitory storage medium of claim 12, wherein the set of instructions to direct the device to perform acts of:
    receiving the plurality of media signals that having various video resolutions from a broadcasting source.

14. The non-transitory storage medium of claim 12, wherein the set of instructions, when to direct the device to perform the act of obtaining the terminal profile, direct the device to perform act of:
    obtaining the terminal profile locally in a storage of the device;
    obtaining the terminal profile from a pre-stored profile in the terminal device; or
    obtaining the terminal profile from a user.

15. The non-transitory storage medium of claim 12, wherein the plurality of media signals comprises linear TV programs from a TV broadcaster, and wherein the linear TV programs comprises at least one of: live sports, live news, and live events.

16. The non-transitory storage medium of claim 12, further configured to store the obtained terminal profile.

17. The device of claim 1, wherein the plurality of media signals of various video resolutions are each from a different media source.

18. The device of claim 7, wherein the plurality of media signals having various video resolutions are each from a different media source.

19. The device of claim 12, wherein the plurality of media signals having various video resolutions are each from a different media source.

* * * * *